United States Patent
Wilson et al.

[15] 3,659,421
[45] May 2, 1972

[54] HYDRAULIC BRAKING SYSTEMS FOR VEHICLES

[72] Inventors: Alexander J. Wilson; Stuart B. Dawson, both of Warwickshire, England

[73] Assignee: Girling Limited, Birmingham, England

[22] Filed: Oct. 2, 1970

[21] Appl. No.: 77,708

Related U.S. Application Data

[63] Continuation of Ser. No. 833,329, June 16, 1969, abandoned.

[30] Foreign Application Priority Data

June 14, 1968 Great Britain.....................28,296/68
June 14, 1968 Great Britain.....................28,299/68
Apr. 1, 1969 Great Britain.....................16,888/69

[52] U.S. Cl........................................................60/54.5 P
[51] Int. Cl.................................................F15b 7/00
[58] Field of Search.................................60/54.5 P

[56] References Cited

UNITED STATES PATENTS

| | | | |
|---|---|---|---|
| 3,183,670 | 5/1965 | Schultz et al. | 60/54.5 P |
| 2,992,533 | 7/1961 | Hodkinson | 60/52 B |

*Primary Examiner*—Martin P. Schwadron
*Assistant Examiner*—A. M. Zupcic
*Attorney*—Imirie and Smiley

[57] ABSTRACT

A power-operated tandem master cylinder includes first and second pressure spaced located respectively between a main piston and a secondary piston, and between the secondary piston and a closed end of a cylinder bore in which the piston work. A pair of axially spaced spring loaded tilting valves are adapted to be actuated upon movement of a rod associated with the main piston to cut off communication between a reservoir and permit fluid under pressure to enter the first pressure space. The pressure fluid in the first pressure space is then delivered to the brakes of one brake circuit and acts on the secondary piston to pressurize fluid in the second pressure space for delivery to the brakes of another brake circuit.

18 Claims, 2 Drawing Figures

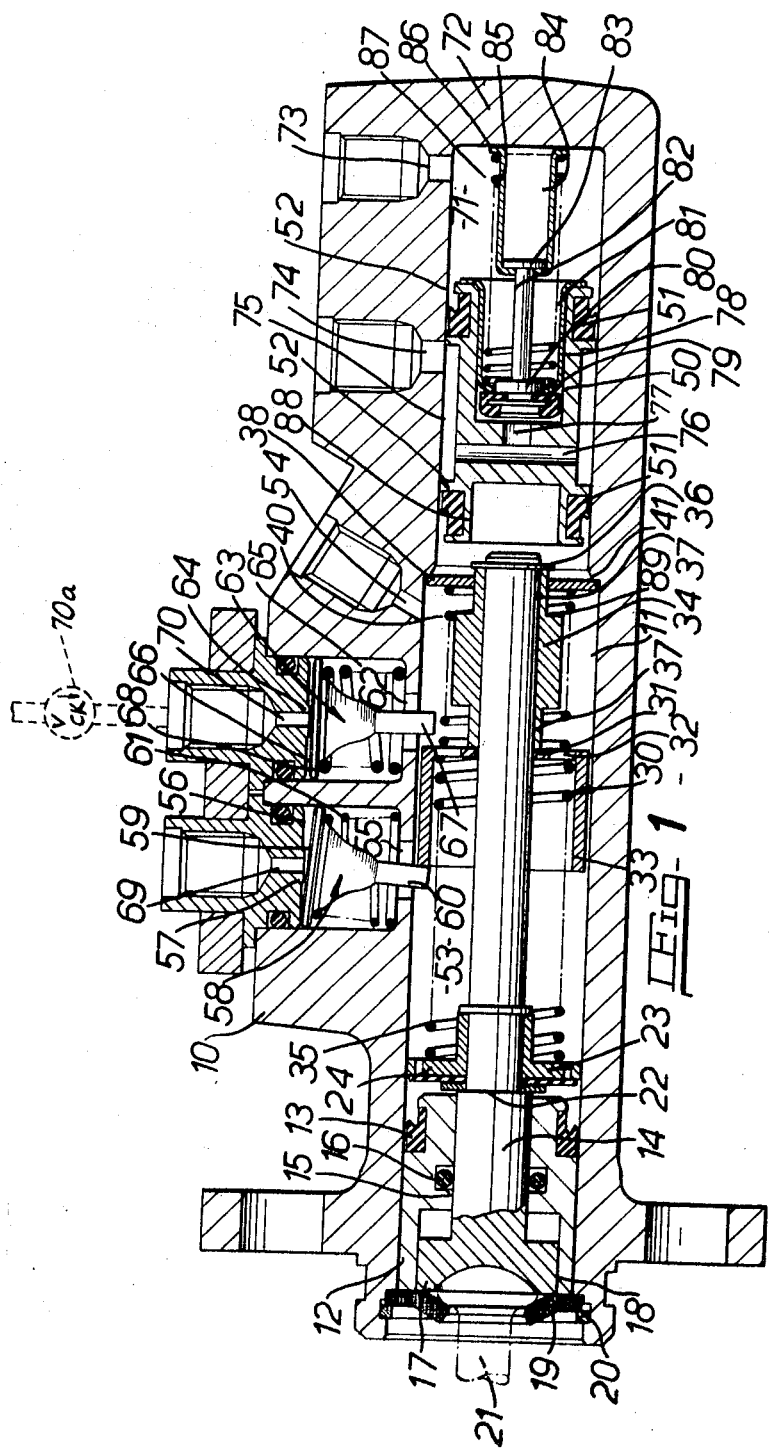

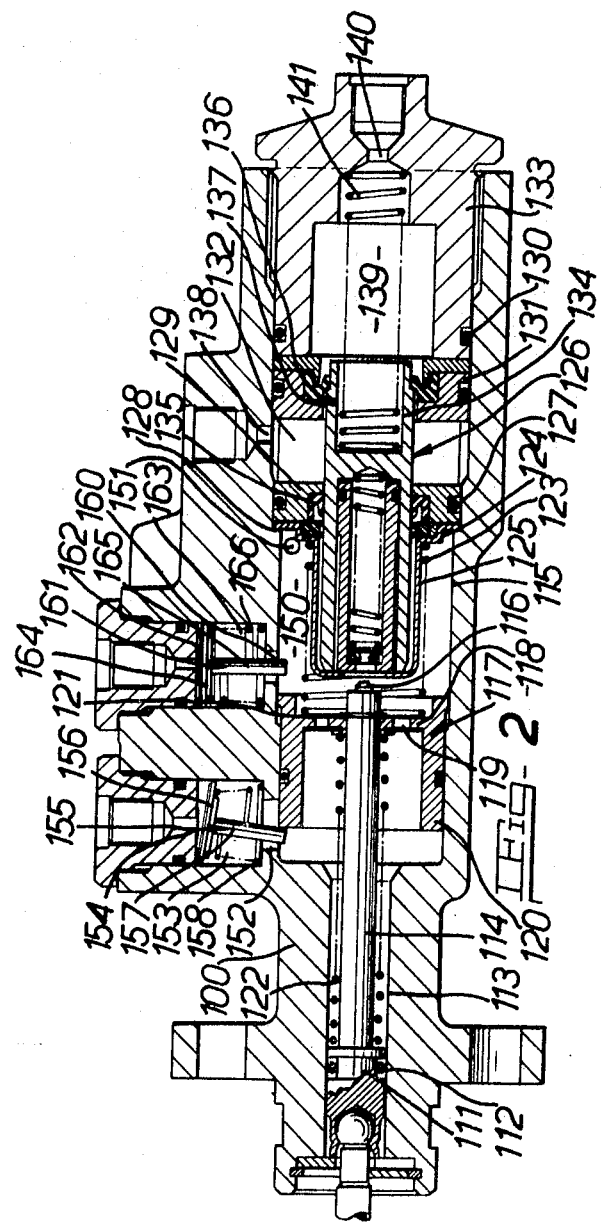

HYDRAULIC BRAKING SYSTEMS FOR VEHICLES

This application is a continuation of Ser. No. 833,329, filed on June 16, 1969 now abandoned.

This invention relates to improvements in hydraulic braking systems for vehicles of the kind in which slave cylinders for actuating brakes of primary and secondary braking circuits are supplied with fluid under pressure from a pump or other source of pressure fluid under the control of a master cylinder actuated by a pedal. More particularly our invention is concerned with a new or improved master cylinder for use in an hydraulic braking system of the kind set forth.

According to our invention a master cylinder for use in an hydraulic braking system of the kind set forth comprises a cylinder body, a positively actuated first piston axially movable in a bore in the cylinder body, a secondary piston located in the bore between the first piston and one end of the cylinder body, a first pressure space in the cylinder bore, defined at least in part between the first piston and the secondary piston and adapted to be connected to the slave cylinders of a primary brake circuit, a first passage in the cylinder body adapted to be connected to a pressure source and opening into the first pressure space, a normally closed first valve controlling the first passage, a second passage in the cylinder body adapted to be connected to a reservoir for the pressure source and leading into the first pressure space, a normally open second valve controlling the second passage, a second pressure space between the secondary piston and the said one end of the cylinder body and adapted to be connected to the slave cylinders of the secondary brake circuit, a third passage in the cylinder body adapted to be connected to a reservoir for fluid, and a normally open third valve controlling communication between the third passage and the second pressure space, the arrangement being such that a small forward movement of the first piston effects closure of the second valve and effects opening of the first valve to permit fluid from the pressure source to flow to the slave cylinders of the primary brake circuit and apply pressure to the secondary piston which advances towards the said one end of the cylinder bore, closing the third valve and thereafter supplying fluid under pressure to the slave cylinders of the secondary brake circuit.

The first piston may be mounted on an imperforate pedal-operated rod axially movable through a main piston axially movable in the cylinder bore, and a lost motion coupling between the rod and the main piston permits a limited axial movement of the rod independently of the main piston but insufficient to cause the rod to engage the secondary piston. Thus a small forward movement of the rod effected by the pedal closes the second valve and opens the first valve to permit fluid from the pressure source to flow to the slave cylinders of the primary brake circuit and apply pressure to the secondary piston which advances towards the said one end of the cylinder bore, closing the third valve and thereafter supplying fluid under pressure to the slave cylinders of the secondary brake circuit, and a greater movement of the rod takes up the lost motion between the rod and the main piston to apply pressure to the first pressure space in the event of failure of the supply of pressure fluid, the rod engaging and advancing the secondary piston to apply pressure to the secondary pressure space in the event of failure of the supply of pressure fluid, or the first pressure space.

Alternatively, the first piston may comprise a pedal-operated main piston working in the cylinder bore and having an axial extension in the form of an imperforate rod which extends into the bore for a substantial distance. Normally a small movement of the rod in the bore is sufficient to effect closure of the second valve and opening of the first valve to permit fluid from the pressure space to flow to the slave cylinders of the primary brake circuit and apply pressure to the secondary piston which advances in the bore and thereafter supplies fluid under pressure to the slave cylinder of the secondary brake circuit. However, upon failure of the pressure source or the first pressure space, additional movement of the rod causes the inner end of the rod to engage and advance the secondary piston in the bore to apply pressure to the secondary pressure space.

In each of these constructions the first and second valves each comprise a spring-loaded tilting valve incorporating a stem which extends into the path of cage assembly slidably mounted on the imperforate rod and by which it is engaged to effect opening of that valve.

Two embodiments of our invention are illustrated in the accompanying drawings in which:

FIG. 1 is a longitudinal section through one construction of tandem master cylinder; and FIG. 2 is a longitudinal section through another construction of tandem master cylinder.

In the tandem master cylinder illustrated in FIG. 1 10 is a body having a stepped longitudinal bore 11. A main piston 12 is provided with a seal 13 and works in the portion of the bore 11 of greater diameter. An imperforate rod 14 is axially slidable through a bore 15 in the main piston 12 in which is located a seal 16, and has on its outer end an enlarged head 17 received in a counterbored recess 18 in the outer end of the main piston 12. The axial length of the head 17 is less than the axial spacing between the inner end of the recess 18 and a coned washer 19 which is retained in the rear end of the cylinder bore 11 by a spring ring or circlip 20 and also forms a stop for the rearward movement of the main piston 12 and holds a boss on the end of an operating rod 21 in engagement with the outer end of the imperforate rod 14. The imperforate rod 14 thus has a limited free movement, relative to the main piston 12, determined by the clearance between the head 17 and the base of the counterbored recess 18 in the main piston 12.

At a short distance beyond the rear inner end of the main piston 12 the diameter of the imperforate rod is reduced and a shoulder 22 at the step in diameter provides an abutment for a plate assembly or first piston 23 which incorporates a flap type valve member adapted to damp the flow of fluid through openings in a circular flange 24 at the forward end of the plate assembly and of a diameter slightly less than that of the cylinder bore of greater diameter. This feature forms the subject of our co-pending patent application Ser. No. 28,297/68 of even date and need not be described further herein.

A cage assembly 30 slidably mounted on the imperforate rod 14 at an intermediate point in its axial length includes a radial flange 31 provided with a plurality of ports 32 and an annular shroud 33 extending axially towards the main piston 12 from the outer edge of the flange 31. The rear face of the flange 31 is held in abutment with the forward end of a spacer member 34 through which the imperforate rod 14 extends by means of a strong compression spring 35 acting between the flange 31 of the cage assembly 30 and the flange 24 of the first piston 23. The spacer member 34 is held on the imperforate rod 14 by an annular retaining ring 35 at the rear end of the rod 14 and against which the spacer member 24 abuts due to the force in the strong compression spring 35.

The spacer member 34 includes spaced end portions 37 of reduced diameters. An abutment plate 38 slidably mounted on the reduced end portion 37 of the spacer member 34 remote from the main piston 12 is urged towards the retaining ring 34 by a compression spring 40 acting between the abutment plate 38 and the pradial flange 31 of the cage assembly 30 to hold the abutment plate against a shoulder 41 at the change in diameter of the stepped bore 11. The compression spring 40 is of less strength than the strong compression spring 35.

The main piston 12, the imperforate rod 14 carrying the first piston 23 and the cage assembly 30, the spacer member 34 and the abutment plate 38 comprises a sub-assembly which contains the forces of the compression spring 35 and 40. The sub-assembly is slightly greater in length than the portion of the bore 11 of the cylinder body 10 of greater diameter. When the sub-assembly is inserted into the cylinder bore from the forward open end, the abutment plate 38 engages with the shoulder 41 in the body at the step in diameter, and the lighter spring 40 is compressed slightly to allow the sub-assembly to be accommodated within the bore, and to be held in position by the coned washer 19 and the circlip 20.

A secondary piston 50 provided at opposite ends with axially spaced annular sealing rings 51 located in axially spaced annular recesses 52 works in the portion of the cylinder bore 11 of smaller diameter and is normally spaced at its forward end from the rear end of the cylinder body 10. A first pressure space 53 in the cylinder bore 11 between the first piston 23 and the secondary piston 50 is connected to the slave cylinders of the brakes of a primary braking circuit, conveniently the rear wheels of the vehicle, through an outlet port 54 in the wall of the cylinder body 10.

Communication between the first pressure space 53 and a reservoir is established, in the off position of brake, through a port 55 in the wall of the cylinder body 10 leading into a chamber 56 in which is mounted a valve seat 59 controlled by a tilting valve 58. The valve comprises a head 59 having an upper face adapted to engage with the valve seat. The head 59 is mounted on a stem 60 which is urged upwardly by a spring 61 located between the head and the wall of the chamber surrounding the port 55. The lower end of the stem extends downwardly through the port 55 into the path of the free end of the shroud 33 of the cage assembly 30 and, when the main piston 12 and the imperforate rod 14 are in their fully retracted positions, the shroud 33 engages with the lower end of the valve stem 60 and holds the valve 58 in a tilted position shown so that the first pressure space 53 is in free communication with the reservoir.

Communication between the first pressure space 53 and a source of high pressure fluid, such as a pump or hydraulic accumulator, through a further port 62 in the wall of the cylinder body 10 is controlled by a further tilting valve 63 co-operating with a valve seat 64 in a chamber 65 with which the further port 62 communicates. The valve 63 comprises a head 66 having an upper face adapted to engage with the valve seat 64. The head 66 is mounted on a stem 17 which is urged upwardly by a spring 68 located between the head 66 and the wall of the chamber 65 surrounding the port 62. The lower end of the stem 67 extends downwardly through the port 62 into the path of the flange 31 of the cage assembly 30 and, when the amino main 12 and the imperforate rod 14 are in their fully retracted positions, the flange 31 is spaced by a short distance from the stem 67 so that due to the force in the spring 68 the head 66 is urged against the valve seat 64 to prevent fluid under pressure being supplied to the first pressure space 53 from the hydraulic accumulator or pump.

The reservoir and the hydraulic accumulator or pump provide a closed circuit connected at opposite ends between passages 69 and 70 in the wall of the cylinder body from which communication with the ports 55 and 62 is controlled by the tilting valves 58 and 68 respectively. A non-return valve 70a is interposed in the line between the passage 70 and the source of high pressure fluid to permit fluid under pressure to pass to the first pressure space 53 when the tilting valve 65 is open, but which is operative to prevent fluid escaping from the first pressure space 53 upon failure of the supply of fluid pressure, when the tilting valve 65 is open.

A second pressure space 71 in the cylinder bore 11 between the rear end of the secondary piston 50 and wall 72 at the end of the cylinder bore 11 remote from the main piston 12 is connected to the slave cylinders of the brakes of a secondary brake circuit, conveniently the front wheels of the vehicle, through a further outlet port 13 in the wall of the cylinder body 10.

The second pressure space 71 communicates with a hydrostatic reservoir through a port 74 in the wall of the cylinder body 11. The port 74 is positioned so that it communicates at all times and in all positions of the secondary piston 50 in the bore 11 with an axially extending annular recess 75 formed in the outer wall of the secondary piston 50 as a portion of reduced diameter. The secondary piston 50 is provided with a diametrical passage 76 opening at opposite ends into the annular recess 75. A rearwardly extending axial bore 77 connects the diametrical passage 75 to a counterbore recess 78 in the rear end of the secondary piston 50.

Communication between the hydrostatic reservoir and the second pressure space 71 to the rear of the secondary piston 50 through the axial bore 77 is controlled by a washer 79 and valve head 80 mounted for limited axial movement in a cage member 81 located in the counterbored recess 78. The valve head 80 has an axial stem 82 extending rearwardly at the rear end of which is an enlarged head 83 slidably engaged in an axial bore 84 in a second cage member 85. The second cage member 85 has at its rear end an annular flange 86 held in engagement with the end wall 72 of the cylinder bore by means of a compression spring 87 acting between the flanges 86 and the cage member 81 in which the valve head 80 is mounted. The distance by which the valve head 80 can move away from the axial bore 77 is limited by the engagement of the enlarged head 79 with the cage 81 in which it is slidable. A Belleville or other spring washer (not shown) may be located between the valve head 80 and the cage member 51 in which the head 80 is mounted, the washer acting in a direction to urge the head 80 into a closed position in engagement with the wall of the secondary piston 50 surrounding the axial bore 77 which forms a seating for the washer 79.

The cage member 81 is provided with a plurality of apertures (not shown) permitting communication between the axial bore 77 and the second pressure space 71 when the head 80 and washer 79 are spaced from its seating, in the normal off position of the brakes illustrated.

The forward end of the secondary piston 50 is provided with an axially extending recess 88 of a depth greater than the limited free movement of the imperforate rod 14 relative to the main piston 12.

When the pedal is depressed to apply the brakes with the high pressure source operative, the imperforate rod 14 is moved rearwardly through a small distance insufficient to cause the rod 14 to engage the secondary piston. Due to the force in the strong compression spring 35, the cage assembly 30 is moved with the rod 14 through a corresponding distance overcoming the force in the light compression spring 65. The shroud 33 moves out of contact with the tilting valve 58 controlling communication between the reservoir for the high pressure source and the first pressure space 53 to allow the tilting valve 58 to close due to the force in the spring 61. Thereafter, a small additional rearward movement of the cage assembly 30 opens the other tilting valve 65 by the engagement with it of the rear end of the flange 31 of the shroud 33, to permit fluid from the high pressure source to enter the first pressure space 53, by way of the non-return valve, and to pass to the slave cylinders of the primary brake circuit of the vehicle through the outlet port 54. Simultaneously the high pressure fluid acts on the forward end of the secondary piston 50 to advance it in the bore. This causes the valve head and washer 79 and 80 to close the communication between the hydrostatic reservoir and the axial bore 77 and thereafter, upon further movement of the secondary piston 50, fluid under pressure is delivered to the slave cylinders of the secondary brake circuit from the second pressure space through the outlet port 73.

In the event of failure of the high pressure source, further movement of the imperforate rod 14 takes up the clearance between the head 17 on the outer end of the rod and the inner end of the recess 18 in the main piston 12, and a shoulder 89 adjacent to the rear end of the spacer member 34 abuts against the abutment plate 38. Thereafter further depression of the pedal overcomes the force in the strong compression spring 35 and carries with it the main piston 12 to pressurise the fluid in the first pressure space 53 and apply it to the brakes on the primary brake circuit. The imperforate rod 14 thus moves relative to the spacer member 34. The pressure in the first pressure space 53 also acts on the secondary piston 50 to advance the secondary piston 50 in the cylindrical bore 11 and apply to brakes of the secondary brake circuit as described above.

Under these conditions, fluid in the first pressure space 53 is prevented from returning to the high pressure source through the port 62 due to the provision of the non-return valve which is closed automatically.

Since opposite ends of the secondary piston 50 are of equal areas, the pressure in the pressure spaces 53 and 71 are equal and a pressure balance is achieved so that the pressure of fluid applied to both brake circuits is equal.

In each phase of operation described above, each sealing ring 52 in the secondary piston 50 is subjected at opposite ends to the pressure in one pressure space 53 or 71, and to atmospheric pressure. This has the advantage that should one seal fail, in the application of the brake, pressure in the pressure space acting on the other seal will still be maintained, and the performance of the brakes in the brake circuit actuated from that pressure space will not be impaired.

In the event of failure of the high pressure source and failure of the supply of fluid in the first pressure space 53, further depression of the pedal advances the imperforate rod with respect to the spacer member 34 further. The rear end of the rod 14 engages with the rear end of the secondary piston 50 to advance the secondary piston 50 in the bore 11 and deliver fluid under pressure to the slave cylinders of the secondary brake circuit from the second pressure space 71 and through the outlet port 73.

With the high pressure source operative, in the event of failure of the supply of fluid in the second pressure space, fluid under pressure from the high pressure source is delivered to the slave cylinders of the brakes of the primary brake circuit of the vehicle only.

In all the conditions set forth above, after the foot pedal is released, the master cylinder is restored to its normal position due to the action of the compression springs 35 and 40 loading the imperforate rod 14, and the compression spring acting between the cages associated with the secondary piston.

Our invention has the advantage that, unless both pressure spaces 53 and 71 fail simultaneously, irrespective of the other operating conditions at least the brakes of one of the brake circuits can be applied.

The tandem master cylinder illustrated in FIG. 2 comprises a body 100 having a stepped longitudinal bore. A first or main piston 111 proved with a seal 112 works in the portion 113 of the bore of smaller diameter and is provided with an axial extension 114 in the form of an imperforate rod. The rod 114 extends into the portion 115 of the bore of greater diameter and terminates at its inner end in a nose portion 116 of reduced diameter.

A cage assembly 117 slidably mounted on the imperforate rod 114 at an intermediate point in its axial length includes a radial flange 118 provided with a plurality of ports 119 and an annular shroud 120 extending axially in opposite directions with respect to the flange 118. The inner face of the flange 118 is held in abutment with a collar 121 on the rod 114 by a compression spring 122 acting between the first piston 111 and the flange 118 of the cage assembly 116. The cage assembly 117, together with the plunger 114 and the first piston 111, are normally held in the position shown by a return spring 123 acting between the flange 118 and an outwardly extending flange 124 on the inner end of an abutment stop 125 of top hat section enclosing the adjacent end of a secondary piston 126.

The portion 115 of the stepped bore is counterbored at 127 from its outer end and a shoulder 128 at the step in diameter forms an abutment for an annular ring 129. The counterbored portion 127 is counterbored again at 130 to form a location for a second annular ring 131 which is spaced from the first by a spider or similar member 132 integral with the ring 131, and the rings 129 and 131 are clamped in position by a plug 133 screwed into the outer end of the counterbore 130.

The secondary piston 26 in the form of a telescopic assembly forms the subject of our pending patent application Ser. No. 16,377/69 and need not be described herein. The secondary piston 126 is slidably received in aligned central openings in the rings 128, 131 and includes an axial recess 134 in its innermost end.

Each ring 129, 131 is formed in its inner perioheral edge with an annular recess in which is housed a seal 135, 136 having a continuous radial lip sealing against the outer peripheral wall of the secondary piston 126. In the inoperative position shown a port 137 in the wall of the secondary piston 126 provides a communication between a radial port 138 in the wall of the body 100 connected to a hydrostatic reservoir for hydraulic fluid and a pressure space 139 between the inner end of the secondary piston 126 and an outlet port 140 in a plug 133 closing the inner end of the cylinder bore. The outlet port 140 is adapted to be connected to the slave cylinder of a secondary brake circuit of a vehicle. The secondary piston 126 is held in the retracted position shown in the drawing by a compression spring 141 acting between the plug 133 and the base of the recess 134.

A first or primary pressure space 150 is defined in the cylinder bore between the first piston 11 and the secondary piston 126 and is connected to the slave cylinders of a primary brake circuit of the vehicle through an outlet port 151. Communication between the first or primary pressure space 150 and a reservoir is established, in the off position of brake, through a port 152 in the wall of the cylinder body 100 leading into a chamber 153 in which is mounted a valve seat 154 controlled by a tilting valve 155. The valve 155 comprises a head 156 having an upper face adapted to engage with the valve seat 154. The head 156 is mounted on a stem 157 which is urged upwardly by a spring 158 located between the head 157 and the wall of the chamber 153 surrounding the port 152. The lower end of the stem 157 extends downwardly through the port 152 into the path of the outer free end of the shroud 120 of the cage assembly 117 and, when the main piston 111 and the imperforate rod 114 are in their fully retracted positions illustrated, the shroud 120 engages with the lower end of the valve stem 157 to hold the valve 155 in a tilted position so that the first pressure space 150 is in free communication with the reservoir.

Communication between the first pressure space 150 and a source of high pressure fluid, such as a pump or hydraulic accumulator, through a further port 160 in the wall of the cylinder body, is controlled by a further tilting valve 161 cooperating with a valve seat 162 in a chamber 163 with which the port 160 communicates. The valve 161 comprises a head 164 having an upper face adapted to engage with the valve seat 162. The head 164 is mounted on a stem 165 which is urged upwardly by a spring 166 located between the head 164 and the wall of the chamber surrounding the port. The lower end of the stem 165 extends downwardly through the port 160 into the path of the inner free end of the shroud 120 of the cage assembly 117 and, when the main piston 11 and the imperforate rod 114 are in their fully retracted positions, the shroud 120 is spaced by a short distance from the stem 165 so that, due to the force in the spring 166, the head 164 is urged against the valve seat 162 to prevent fluid under pressure being supplied to the first pressure space 150 from the pressure source.

The reservoir and the source of fluid under pressure, provide a closed circuit connected at opposite ends between the ports 152 and 160 in the wall of the cylinder body 100, and a non-return valve is located in the line between the pressure source and the tilting valve 161 to prevent the return of hydraulic fluid from the pressure space 150 to the pressure source when the tilting valve 161 is open.

When a pedal connected to the first piston 111 is depressed to apply the brakes with the high pressure source operative, the piston 111 and the imperforate rod 114 are moved forwardly through a small distance. Due to the force in the compression spring 122, the cage assembly 117 is moved with the rod 114 through a corresponding distance against the force in the compression spring 123. The shroud 120 moves out of contact with the tilting valve 155, to allow this tilting valve 155 to close under the influence of the spring 152 and cut off communication between the pressure space 150 and the reservoir. Thereafter a small additional forward movement of the cage assembly 117 opens the other tilting valve 161, by the engagement of its stem 165 with the inner free end of the shroud 120, to permit fluid from the high pressure source to enter the first pressure space 150 and to pass to the slave cylinders of the primary brake circuit of the vehicle through the outlet port 151. Simultaneously the high pressure fluid acts on the forward end of the secondary piston 126 to advance it in the bore. The movement of the secondary piston 126 is assisted by the compression spring 123, and the secondary piston 126 sweeps through the seal 136 which in turn seals against the external surface of the secondary piston 126 in a position inwardly from the port 137 to cut off communication between the port 138 and the pressure space 139. Thereafter, upon further movement of the secondary piston 126 fluid under pressure is delivered to the slave cylinders of the secondary brake circuit from the second pressure space 139.

In the event of failure of the high pressure source or the pressure space 150, when the brakes are being applied, further movement of the rod 114 in the cylinder bore causes the inner end of the rod to engage with and advance the secondary piston to deliver fluid under pressure from the second pressure space 139 to the secondary brake circuit. During this operation the cage assembly 117 engages with the stem 165 of the tilting valve 161 which acts as a stop and thus the rod 114 slides through the flange 118 against the force in the compression spring 122.

We claim:

1. A master cylinder for use in a hydraulic braking system comprising a cylinder body, a main piston axially moveable in a bore in said cylinder body, a secondary piston located in said bore between said main piston and one end of said cylinder body, an imperforate pedal-operated rod axially moveable through said main piston and engageable with said secondary piston, a lost motion coupling between said rod and said main piston constructed and arranged to permit a limited axial movement of said rod independently of said main piston, but insufficient to cause said rod to engage said secondary piston, a first pressure space in said cylinder bore between said main piston and said secondary piston, a first passage in said cylinder body adapted to be connected to a fluid pressure source and opening into said first pressure space, a normally closed first valve controlling said first passage, a second passage in the cylinder body leading into said first pressure space, a normally open second valve controlling said second passage, a second pressure space between said secondary piston and the said one end of said cylinder body, a third passage in said cylinder body adapted to be connected to a reservoir for fluid, and a normally open third valve controlling communication between said third passage and said second pressure space, the arrangement being such that a small forward movement of said rod effected by said pedal closes said second valve and opens said first valve to permit fluid from said pressure source to flow to said first pressure space and apply pressure to said secondary piston which advances toward the said one end of said cylinder bore, closing said third valve and thereafter pressurizing fluid in said second pressure space, a greater movement of said rod taking up lost motion between said rod and said main piston to apply pressure to said first pressure space in the event of failure of said fluid pressure source, and said rod engaging and advancing said secondary piston to apply pressure to said second pressure space in the event of failure of said fluid pressure source and said first pressure space.

2. A master cylinder as claimed in claim 1 wherein said first and second valves comprise axially spaced spring loaded tilting valves and, said imperforate rod carries a cage assembly located between and adapted to cooperate with, stems of said tilting valves, the axial positions of said valves in said cylinder being such that in the off position of the master cylinder said cage assembly engages said stem of said second valve to hold it open and is spaced from said stem of said first valve, and on forward movement of said rod, said second valve closes before said first valve is opened.

3. A master cylinder as claimed in claim 2 wherein said cage assembly comprises a radial flange provided with an axially extending annular shroud of which ends are adapted to engage sequentially with said stems of said first and second tilting valves.

4. A master cylinder as claimed in claim 3, incorporating a compression spring normally adapted to urge said flange of said cage member into engagement with an abutment on said rod, said compression spring acting between said first piston and said flange and stop means adapted to cooperate with said cage assembly to permit said rod to move relative to said cage assembly and into engagement with said secondary piston, when said rod is moved by a distance greater than the said limited movement.

5. A master cylinder as claimed in claim 4, wherein said stop means comprise an abutment plate engaging with a shoulder in said cylinder bore and a spacer member mounted on said rod at an end remote from said main piston is provided with opposite ends of which one engages with said flange and the other engages with an abutment on said rod, said spacer member having a shoulder adapted to abut against said abutment plate.

6. A master cylinder as claimed in claim 1 including a non-return valve interposed between said first passage and said pressure source to permit fluid to pass from said pressure source to said first pressure space when said first valve is open, but which is operative to prevent fluid escaping from said first pressure space upon failure of said pressure source, and when said first valve is open.

7. A master cylinder as claimed in claim 1, wherein said third valve comprises a valve head located in a recess in an end of said secondary piston remote from said main piston between said second pressure space and said third passage through an axial passage in said secondary piston, a coupling normally holding said valve head away from a seating around an adjacent end of said axial passage when the master cylinder is in the off position.

8. A master cylinder as claimed in claim 7, wherein said axial passage at the end remote from said seating communicates with an annular recess in the external peripheral wall of the secondary piston, and axially spaced annular seals are provided between said cylinder bore and said secondary piston at opposite ends of said recess, the axial length of said annular recess being chosen such that it is at all times in communication with said third passage.

9. A master cylinder for use in an hydraulic system comprising a cylinder body, a pedal-operated main piston axially moveable in a bore in the cylinder body, an axial extension in the form of an imperforate rod carried by said main piston and extending into said cylinder bore for a substantial distance, a secondary piston located in said bore between said main piston and one end of said cylinder body, a first pressure space in the cylinder bore defined between said main piston and said secondary piston, a first passage in the cylinder body opening into said first pressure space, a normally closed first valve controlling said first passage, a second passage in the cylinder body leading into said first pressure space, a normally open second valve controlling said second passage, a second pressure space between said secondary piston and the said one end of the cylinder body, a third passage in said cylinder body, and a normally open third valve controlling communication between said third passage and said second pressure space, the arrangement being such that a limited forward movement of said rod effects closure of said second valve and effects opening of said first valve to permit fluid from said first passage to flow to said first pressure space and apply pressure to the secondary piston which advances toward the said one end of the cylinder bore, closing said third valve and thereafter pressurizing fluid in said second pressure space, and a greater movement of said rod causing the inner end of said rod to engage and advance said secondary piston in said bore to supply pressure to said second pressure space in the event of pressure failing in said first pressure space.

10. A master cylinder as claimed in claim 9 wherein said first and second valves comprise axially spaced spring loaded tilting valves and said imperforate rod carries a cage assembly located between and adapted to cooperate with stems of said tilting valves, the axial positions of said valves in said cylinder being such that in the off position of the master cylinder said cage assembly engages said stem of said second valve to hold it open and is spaced from said stem of said first valve, and on forward movement of said rod, said second valve closes before said first valve is opened.

11. A master cylinder as claimed in claim 10, wherein said cage assembly comprises a radial flange provided with an axially extending annular shroud of which opposite ends are adapted to engage sequentially with said stems of the first and second tilting valves.

12. A master cylinder as claimed in claim 11, incorporating a compression spring normally adapted to urge said flange of said cage member into engagement with an abutment on said rod, said compression spring acting between said piston and the flange and stop means adapted to cooperate with said cage assembly to permit said rod to move relative to said cage assembly and into engagement with said secondary piston when said rod is moved by a distance greater than the said limited movement.

13. A master cylinder as claimed in claim 12, wherein said stop means comprises said stem of said first tilting valve.

14. A master cylinder as claimed in claim 9, including a non-return valve located upstream of said first valve to permit fluid to pass to said first pressure space when said first valve is open, but which is operative to prevent fluid escaping from said first pressure space.

15. A master cylinder as claimed in claim 9, wherein said secondary piston works through axially spaced seals in said cylinder body and a port in a wall of a recess at the inner end of said secondary piston is located between said seals to provide communication between said third passage and said second pressure space, a portion of said secondary piston containing said port being moveable through one of said seals to cut off communication between said third passage and said second pressure space when said secondary piston is advanced in said bore.

16. A master cylinder assembly for use in an hydraulic braking system comprising a cylinder body assembly, a positively actuated first piston assembly moveable axially in a first portion of a cylinder bore in said body assembly, a secondary piston assembly moveable axially in a second portion of said bore between said first piston assembly and a closed end of said second cylinder bore portion, said secondary piston assembly dividing said cylinder bore into first and second pressure spaces, a first outlet in a wall of the cylinder body for connecting said first pressure space to a first brake circuit, a second outlet in said wall of the cylinder body for connecting said second pressure space to a second brake circuit, a first valve for providing communication between a source of hydraulic fluid under pressure and one of said pressure spaces, a second valve for providing communication between the said one pressure space and a reservoir for the source of hydraulic fluid under pressure, said first and second valves being axially spaced in the wall of the cylindrical body and being engageable by one of said piston assemblies, said first valve normally being closed and said second valve normally being held in an open position by the said one piston assembly but on movement of said one piston assembly towards said first valve, said second valve closes before said first valve is opened, and a third normally open valve for providing communication between the other pressure space and a reservoir for hydraulic fluid, the arrangement being such that axial movement of said positively actuated first piston assembly into said first portion of said bore subjects said first pressure space to fluid under pressure which is supplied to said first outlet and which acts simultaneously on said secondary piston assembly to advance it in said bore and supply fluid under pressure to said second outlet.

17. A master cylinder assembly as claimed in claim 16 wherein said cylinder body assembly comprises a single housing incorporating said first and second bore portions.

18. A master cylinder assembly as claimed in claim 16, wherein said third valve provides communication between said reservoir for hydraulic fluid and said second pressure space, and said first and second valves are spring loaded tilting valve providing communication respectively between said source of hydraulic fluid under pressure and said first pressure space, and between said first pressure space and said reservoir for said source of hydraulic fluid pressure.

* * * * *